B. SCHECHTER.
CAR SEAT STRUCTURE.
APPLICATION FILED APR. 30, 1921.
1,412,139.
Patented Apr. 11, 1922.
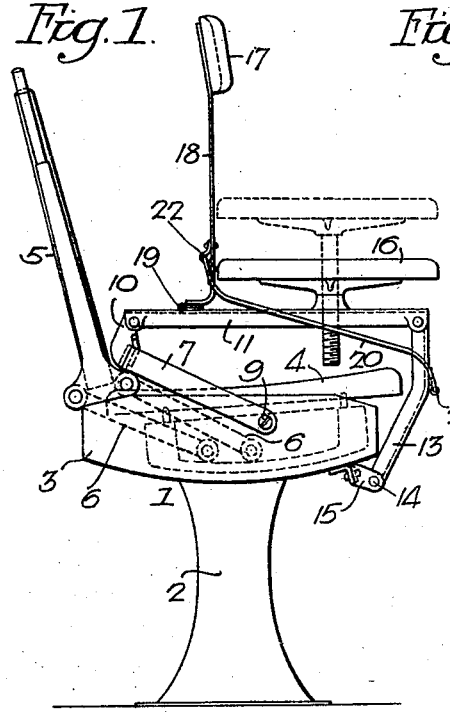
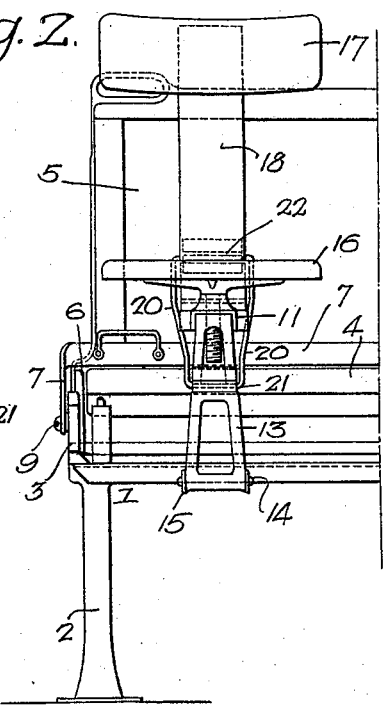
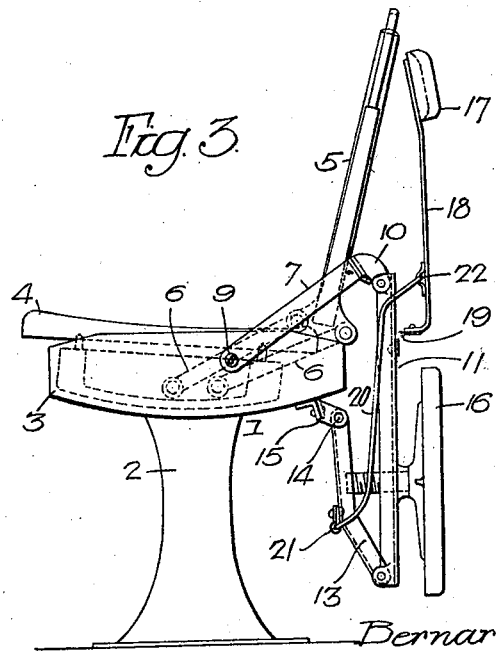
Inventor-
Bernard Schechter
by his Attorneys-
Howson & Howson

UNITED STATES PATENT OFFICE.

BERNARD SCHECHTER, OF ST. LOUIS, MISSOURI, ASSIGNOR TO AMERICAN CAR COMPANY, OF ST. LOUIS, MISSOURI, A CORPORATION OF MISSOURI.

CAR-SEAT STRUCTURE.

1,412,139. Specification of Letters Patent. Patented Apr. 11, 1922.

Application filed April 30, 1921. Serial No. 465,737.

*To all whom it may concern:*

Be it known that I, BERNARD SCHECHTER, a citizen of the United States, residing in St. Louis, Missouri, have invented certain Improvements in Car-Seat Structures, of which the following is a specification.

This invention relates to certain improvements in car seats, which are occupied by motormen in what is known as a "one man car." In this type of car, the operating mechanism is located at each end thereof and the motorman occupies a seat which is located above the end seat at either end of the car. This seat is usually made movable so that the end seat of the car can be occupied by passengers, when at the rear of the car.

The object of my invention is to provide a suitable back rest for the motorman's seat. This back rest is movable into and out of position with the motorman's seat.

In the accompanying drawings:

Fig. 1 is an end view of a car seat, showing the motorman's seat in position above the seat portion of the car seat structure and the back in the raised position;

Fig. 2 is a side view of a portion of the main car seat structure; and

Fig. 3 is a view showing the motorman's seat and the back moved out of position, the back of the main seat structure being shifted to the opposite side of the seat from that shown in Fig. 1.

The particular form of movable motorman's seat illustrated in the drawings is fully set forth and claimed by me in an application for patent filed on the twenty-fourth day of February, 1921, under Serial No. 447,501.

1 is the car seat having a pedestal 2 and a frame 3, which carries the seat section 4. 5 is the back of the car seat connected by links 6 shown by dotted lines in Fig. 1 to the frame 3 in the usual manner so that the back can be shifted to either side of the seat section, according to the direction in which the car is moving.

7 is a frame, which is pivoted at 9 to each end of the car seat structure and carried by this frame is a bearing 10 to which is pivoted a seat carrying frame 11 which, in turn, is pivoted to a link frame 13 pivoted at 14 to a bracket 15 on the under side of the car seat structure.

16 is the motorman's seat, which is adjustably mounted in the frame 11. This motorman's seat can be shifted from the position illustrated in Fig. 1, where the seat 16 is directly above the seat 4 of the car seat structure, to the position shown in Fig. 3 at one side of the seat structure. The back 5 of the car seat can then be shifted from the position illustrated in Fig. 1 to that illustrated in Fig. 3. This allows two passengers to occupy the car seat 4. In some instances, it is desirable to provide a back for the motorman's seat and this back should be so constructed that it can be moved out of the way with the movement of the seat occupied by the motorman.

18 is a back support made of sheet metal, in the present instance, pivoted to the seat supporting frame 11 at 19 and having at its upper end a transverse back rest 17, which may be upholstered in any suitable manner, if desired. A link 20, formed of wire in the present instance, is hinged at 21 to the link frame 13 and is hinged at 22 to the back support 18 above the pivot 19. This link forms a brace for the back support. When the motorman's seat is shifted from the position illustrated in Fig. 1 to that illustrated in Fig. 3, the back support is tilted backwards and assumes a position substantially parallel with the face of the motorman's seat 16 in the rear of the main back 5 of the car seat structure, Fig. 3. This is accomplished by pivoting the link 20, as indicated in the drawings.

When the back 5 is again shifted to the position illustrated in Fig. 1, the seat structure, with its back rest, can be raised and moved into position above the seat 4, while the back rest will assume the position illustrated in Fig. 1 to support the back of the motorman.

I claim:

1. The combination of a car seat structure having a movable back arranged to be shifted to either side of the seat structure; a seat-carrying frame; a motorman's seat mounted thereon, said frame being coupled to the seat structure so that it can be moved above the seat of the seat structure or to one side thereof to allow the back of the car seat structure to be shifted; a pivoted back rest for the motorman's seat; and a connection attached to the back rest and to a portion of the seat-carrying frame so that, when the frame is shifted, the back rest will also be shifted to a position at the rear of the back of the seat structure, allowing the seat structure to be occupied by passengers.

2. The combination of a car seat structure having a movable back arranged to be shifted to either side of the seat structure; a seat-carrying frame; a motorman's seat mounted thereon, said frame being coupled to the seat structure so that it can be moved above the seat of the seat structure, or to one side thereof, to allow the back of the car seat structure to be shifted; a back rest pivoted to the seat supporting frame; and a link connecting the back rest to the said seat supporting frame so that, when the frame is shifted, the back rest will also be shifted to a position directly in the rear of the back of the seat structure, allowing said seat structure to be occupied by passengers.

3. The combination of a car seat having a movable back arranged to be shifted to either side of the seat structure; a seat carrying frame pivotally mounted on the seat structure; a link frame pivotally connected to the carrying frame and to the under side of the car seat; a motorman's seat mounted on the seat carrying frame; a back support for the motorman's seat pivoted to the seat carrying frame back of the motorman's seat; and a link pivoted to the back support and to the link frame so that, when the motorman's seat structure is shifted, the back support will be thrown back in order that it will occupy a space substantially on a line with the motorman's seat and back of the main car seat, when said back is shifted.

BERNARD SCHECHTER.